(12) United States Patent
Groll et al.

(10) Patent No.: US 9,585,514 B2
(45) Date of Patent: Mar. 7, 2017

(54) HEAT ZONE PAN

(71) Applicant: All-Clad Metalcrafters LLC, Canonsburg, PA (US)

(72) Inventors: William A. Groll, McMurray, PA (US); John Watkins, Canonsburg, PA (US)

(73) Assignee: All-Clad Metalsrafters, LLC, Canonsburg, PA (US)

( * ) Notice: Subject to any disclaimer, the term of this patent is extended or adjusted under 35 U.S.C. 154(b) by 0 days.

(21) Appl. No.: 14/797,489

(22) Filed: Jul. 13, 2015

(65) Prior Publication Data

US 2015/0313405 A1    Nov. 5, 2015

Related U.S. Application Data

(63) Continuation-in-part of application No. 14/215,287, filed on Mar. 17, 2014, now Pat. No. 9,078,539.

(60) Provisional application No. 61/787,041, filed on Mar. 15, 2013.

(51) Int. Cl.
| | |
|---|---|
| *A47J 36/02* | (2006.01) |
| *A47J 37/10* | (2006.01) |
| *A47J 27/02* | (2006.01) |
| *B23K 20/02* | (2006.01) |
| *A47J 27/022* | (2006.01) |
| *B32B 15/01* | (2006.01) |

(52) U.S. Cl.
CPC .............. *A47J 36/02* (2013.01); *A47J 27/022* (2013.01); *A47J 37/10* (2013.01); *B23K 20/023* (2013.01); *B32B 15/012* (2013.01)

(58) Field of Classification Search
CPC  A47J 36/025; A47J 36/02; A47J 37/10; A47J 27/002; B21D 51/22; B65D 25/14; B23K 20/023; B23K 20/02; B32B 15/012; B32B 15/01
USPC ......... 220/573.2, 573.1, 912, 62.17; 29/447; D7/354; 428/597, 596, 66.6, 131, 137, 428/34.1; 99/422, 401, 447; 126/390.1
See application file for complete search history.

(56) References Cited

U.S. PATENT DOCUMENTS 2,057,254 A  * 10/1936 Sommer ................ A47J 36/02
                                                        220/573.1
2,284,504 A     5/1942 Wrighton et al.
2,576,377 A  * 11/1951 Wochos, Jr. ............ G01B 3/34
                                                        33/555.2

(Continued)

FOREIGN PATENT DOCUMENTS

CN      2892466       4/2007
EP      0966910 A1   12/1999
(Continued)

OTHER PUBLICATIONS

Translation of JP2004009097 (Miyamoto et al.), Apr. 30, 2009, Paragraphs 9 and 11.*

*Primary Examiner* — Robert J Hicks

(74) *Attorney, Agent, or Firm* — The Webb Law Firm

(57) ABSTRACT

Provided is an article of cookware and a method of making same. The cookware is made from a bonded, multi-layer composite comprising a core construction having a central core disc of a high heat conductive material and an outer ring-shaped core disc surrounding and spaced from the central core disc by a gap to minimize thermal conduction from the central core disc to the outer ring-shaped core disc.

14 Claims, 7 Drawing Sheets

(56) References Cited

U.S. PATENT DOCUMENTS

| | | | |
|---|---|---|---|
| 2,765,728 A * | 10/1956 | Pearce | A47J 36/02 126/390.1 |
| 2,908,073 A | 10/1959 | Dulin | |
| 3,054,395 A * | 9/1962 | Torino | A47G 23/0683 126/246 |
| 4,029,253 A | 6/1977 | Cartossi | |
| 4,204,628 A | 5/1980 | Houston et al. | |
| 4,252,263 A | 2/1981 | Houston | |
| 4,315,591 A | 2/1982 | Houston | |
| 4,385,310 A | 5/1983 | Houston | |
| 4,444,352 A | 4/1984 | Glascock, II et al. | |
| 4,790,292 A * | 12/1988 | Kuhn | A47J 36/02 126/390.1 |
| 4,793,324 A * | 12/1988 | Caferro | A21B 1/02 126/369 |
| 5,064,055 A | 11/1991 | Bessenbach et al. | |
| 5,193,737 A | 3/1993 | Carraher | |
| 5,439,165 A | 8/1995 | Cartossi | |
| 5,848,746 A | 12/1998 | Wagner et al. | |
| 6,082,611 A | 7/2000 | Kim | |
| 6,892,781 B2 | 5/2005 | McHerron et al. | |
| 7,159,757 B2 | 1/2007 | Takahashi et al. | |
| 7,168,148 B2 | 1/2007 | Groll | |
| 7,581,669 B2 | 9/2009 | Lee | |
| 7,900,811 B1 | 3/2011 | Alman et al. | |
| 8,037,602 B2 | 10/2011 | Huang | |
| 2004/0232211 A1 | 11/2004 | Kayser et al. | |
| 2006/0117539 A1 | 6/2006 | Alim | |
| 2006/0289487 A1 * | 12/2006 | Tarenga | A47J 27/002 219/621 |
| 2008/0083747 A1 | 4/2008 | Park | |
| 2009/0188909 A1 * | 7/2009 | Jones | A47J 27/002 219/621 |
| 2009/0258248 A1 | 10/2009 | Tsushima | |
| 2010/0055491 A1 | 3/2010 | Vecchio et al. | |

FOREIGN PATENT DOCUMENTS

| | | | | |
|---|---|---|---|---|
| GB | 1329979 A * | 9/1973 | | A47J 36/02 |
| GB | 2034173 A * | 6/1980 | | A47J 27/002 |
| JP | 2002059505 | 2/2002 | | |
| JP | 2002065469 | 3/2002 | | |
| JP | 2004009097 A * | 1/2004 | | B23K 20/00 |
| JP | 2006341272 | 12/2006 | | |
| JP | 4261129 | 4/2009 | | |

* cited by examiner

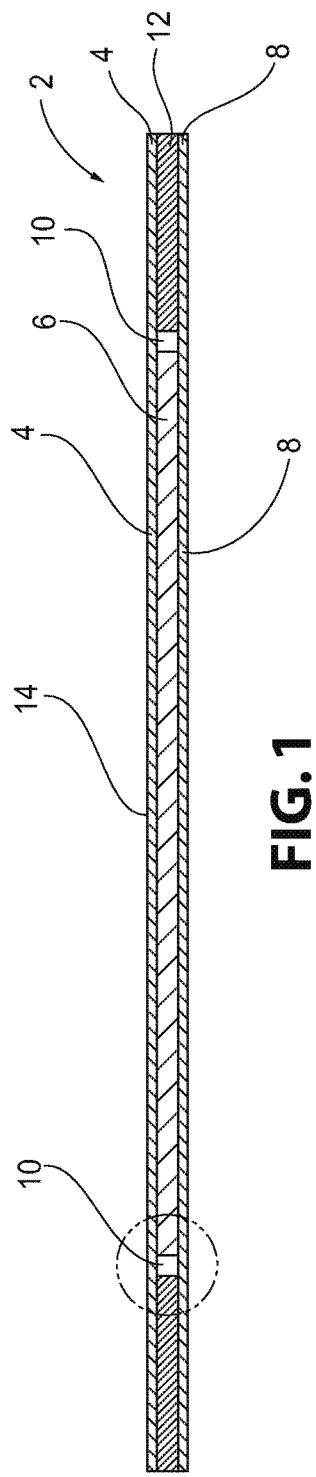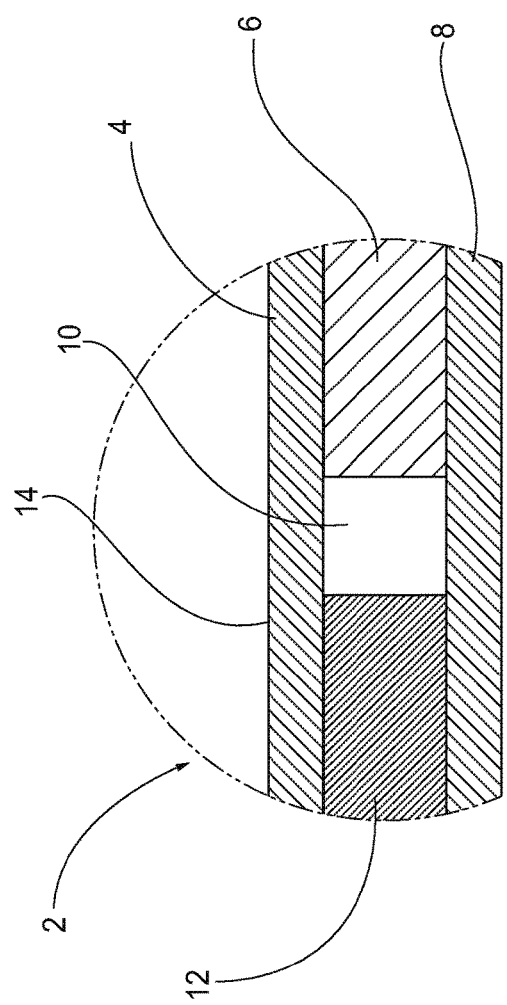

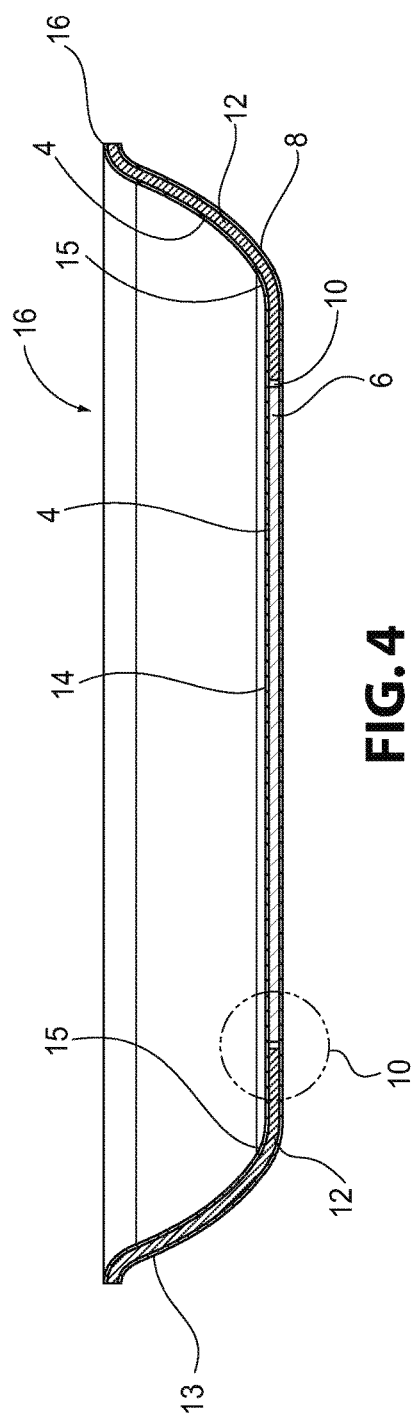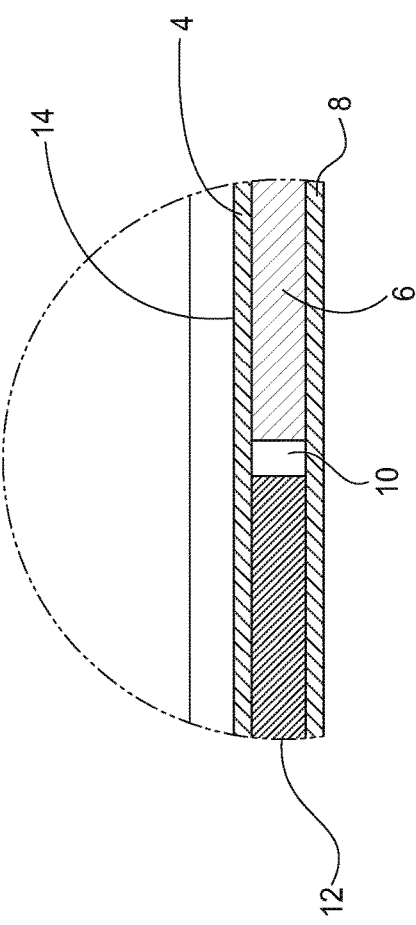
FIG. 4
FIG. 5

HEAT ZONE PAN

CROSS REFERENCE TO RELATED APPLICATIONS

This application is a continuation-in-part of and claims priority to U.S. patent application Ser. No. 14/215,287 filed Mar. 17, 2014, which in turn claims priority to U.S. Patent Application No. 61/787,041, filed Mar. 15, 2013, which are hereby incorporated by reference herein.

BACKGROUND OF THE INVENTION

Field of the Invention

Multi-ply, bonded cookware having a central area of the cooking surface that has a higher level of thermal conductivity than the more distal area of the cooking surface as well as the sidewalls of the cookware. A method for making the cookware using solid state bonding is also disclosed.

Description of Related Art

Multi-ply bonded cookware is known in the art as shown in a number of patents, such as, for example: U.S. Pat. Nos. 4,246,045 and 4,167,606 to Ulam; and U.S. Pat. Nos. 8,133,596 and 6,267,830 to Groll. These patents demonstrate that the manufacture of multi-layer bonded cookware comprising stainless steel outer layers bonded to central layer(s) of a higher conductivity aluminum and/or copper is well known in the art. The bonding between layers of these different materials is commonly achieved by conventional roll-bonding techniques using strips of aluminum and/or copper, roll-bonded to outer strips of stainless steel. It is known that roll-bonding between copper, aluminum, and stainless steel layers is conventional in the art of making composite cookware.

A solid state bonding technique using high pressure and heat to make a plurality of composite blanks of for example, stainless steel—aluminum—stainless steel in the manufacture cookware, is disclosed in our co-pending U.S. patent application Ser. No. 14/215,287.

SUMMARY OF THE INVENTION

An item of cookware, such as a fry pan, is made from a solid state bonded metal composite which contains a central cook surface area having a copper (or aluminum or graphite) disc at its central core with upper and lower layers of stainless steel bonded thereto, the stainless steel layers forming the interior and exterior surface of the cookware. As used herein, the term "solid state bonding" means a method of bonding two or more stacked discs of metals or metal alloys together using high pressure and high temperature, wherein the high pressure is applied in an axial direction, i.e., 90° relative to the plane of the stacked discs. Outer portions of the cook surface and sidewalls of the pan contain an aluminum layer at their core and is bonded to the upper and lower layers of stainless steel. The aluminum core layer is spaced from the outer edge of the central copper disc by a gap so as to insulate the aluminum layer from conductive heat transfer from the copper central core disc. In this manner, the sidewalls of the cookware remain at a lower temperature than the central cook surface. The cooler sidewalls provided by the invention resist the formation of difficult to clean burned-on grease spatter which heretofore occurs in conventional cookware, such as fry pans. The present cookware embodiment having a central core of copper (or aluminum or graphite) and a remaining outer core of aluminum bonded to interior and exterior layers of stainless steel also provides a fry pan, for example, which is lighter in weight than a comparably sized fry pan made from a conventional copper core construction where the copper core extends through the entire sidewall of the fry pan.

The present method for making the cookware comprises the steps of providing inner and outer pre-cut round discs of stainless steel which have been cleaned/degreased and surface prepared for bonding. A round central disc of copper (or aluminum or graphite) is provided and pre-cut to a size smaller than a diameter of the cooking surface of the pan. An annular ring disc of aluminum is provided having an outer diameter equaling the outer diameters of the stainless steel discs and an inner diameter slightly larger than the outer diameter of the central disc of copper. The ring disc of aluminum is placed between the two stainless steel discs with the central core disc of copper (or aluminum or graphite) positioned in the open portion of the aluminum ring such that a uniform gap exists between the central core disc and the inner diameter of the aluminum ring disc. A gap of about 3/16" is appropriate.

After cleaning of the copper central disc and aluminum ring in preparation for bonding, the discs are stacked in an ordered assembly, wherein the stainless is placed above and below the copper central disc and the aluminum ring disc in the middle of the ordered stack.

The assembly of discs are then placed in a pressure device which exerts a high force in a normal or axial direction to the disc assembly, i.e., in a 90° direction to the planes of the stacked discs. A high temperature is applied to the discs while under the force and maintained for a sufficient time to achieve solid state bonding between all of the discs. The bonded assembly of discs is then allowed to cool and removed from the press apparatus for a later forming step to form the bonded discs into a desired cookware shape, such as a fry pan. After solid state bonding and forming, the gap between the central core of copper or aluminum or graphite and the outer aluminum ring disc remains intact to perform the thermal insulation air gap function in the finished cookware article as alluded to above.

Another presently preferred embodiment of the present invention concerning the cookware and the method calls for eliminating the central core of copper and the ring shaped disc of aluminum. In its place, we substitute a unitary core disc of copper or aluminum of an outside diameter equal to that of the upper and lower discs of stainless steel. In one embodiment, the core disc of copper or aluminum has a plurality of closely spaced-apart through holes formed therethrough in a circular pattern around the disc. The through holes in the core disc of copper or aluminum act as a barrier for minimizing thermal conduction from the high heat cook surface to the sidewalls of the cookware much like the above described continuous gap, albeit to a lesser degree. Alternatively, instead of the circular array of holes around the core disc, the core disc can be cut by a laser, for example, to form a circular slot around the core disc to fotin a central core still attached to the outer portion of the disc by uncut webs.

In yet another embodiment, the central core disc can be a graphite disc placed within the aforementioned aluminum ring-shaped disc and solid state bonded between interior and exterior layers of stainless steel. The graphite disc preferably has a plurality of holes formed therethrough for insertion of aluminum plugs therein. The aluminum plugs bond to the stainless steel layer during solid state bonding to secure the graphite central core disc in the multilayer composite.

BRIEF DESCRIPTION OF THE DRAWING(S)

FIG. 1 is a cross-sectional view of a bonded blank assembly of one embodiment of the present invention;

FIG. 2 is an enlarged view of an air gap in the blank assembly of FIG. 1;

FIG. 4 is a cross-sectional view of a formed fry pan shape made from the blank assembly of FIG. 1;

FIG. 5 is an enlarged view of the air gap in the formed fry pan of FIG. 4;

DETAILED DESCRIPTION OF THE INVENTION

Figure 3:
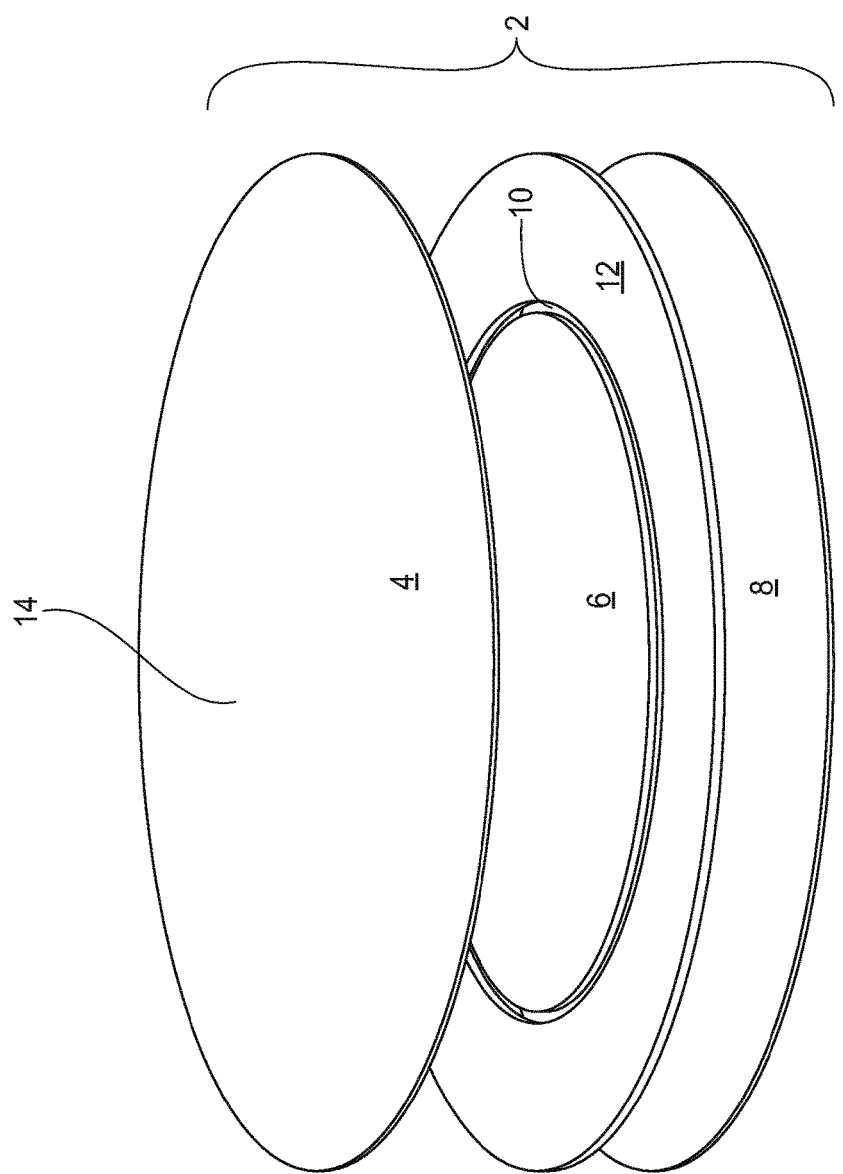
FIG. 3 is an exploded isometric view of the blank assembly of FIG. 1.

With reference now to the drawings, FIGS. 1-3 depict various views of a blank assembly 2 used in making one presently preferred embodiment of the cookware of the present invention. After appropriate surface preparation of the various layers of materials to be used in a bonding step, the materials are positioned in an ordered array to create the blank assembly 2 as shown. The surface preparation step includes degreasing, surface abrasion, and the like, and such surface treatments prior to the bonding are, in themselves, well known in the art.

The blank assembly 2 comprises upper and lower discs 4 and 8 of stainless steel which will form the interior and exterior surfaces, respectively, of the cookware after the bonding and forming steps. The upper and lower discs 4 and 8 of stainless steel are, in one embodiment, about 14 inches in diameter to form a near-net size blank for making a fry pan of 10 inches in diameter, for example. In this manner, scrap losses are minimized. The thickness of discs 4 and 8 may be about 0.015 to 0.03 inches. The lower disc 8 of stainless steel may be of a ferro-magnetic stainless steel such as a 400 grade in order to make the finished cookware suitable for use on an induction cooking apparatus. The upper disc 4 is a food grade stainless steel such as an austenitic 300 grade. Between the stainless steel discs 4 and 8 is a central core disc 6 of copper, copper alloy, or aluminum. Copper is preferably selected due to its higher coefficient of thermal conductivity. The central core disc 6 is preferably round in a near net shape when making round cookware, such as a fry pan. The diameter of the central core disc 6 is sized to be slightly smaller than the desired size of the cook surface of the fry pan so that its outer edge is spaced inwardly from the radiused portion 15 of the formed fry pan 16 (FIG. 4) in the region where the flat bottom transitions to the sidewall of the pan 16. For a 10-inch fry pan, the diameter of the central core disc would be 7-9 inches, for example.

A ring-shaped disc 12 of aluminum surrounds the central core disc 6 as shown in FIGS. 1-3. The ring-shaped disc 12 had a round hole formed therein of a diameter greater than the diameter of the central core disc 6 so as to define an air gap 10 therebetween. A gap 10 of about 3/16" is presently preferred. The air gap 10 functions to thermally insulate the central core disc 6 from the ring-shaped aluminum disc 12 so as to prevent thermal conduction of heat therebetween to provide a cooler sidewall of the cookware during use. The thickness of the central core disc 6 and the ring-shaped disc 12 of aluminum may be on the order of 0.040 inches.

The blank assembly 2 or a plurality of stacked blank assemblies 2 are then placed in an apparatus (not shown) for application of a high load or pressure in the normal direction relative to the planes of discs in the blank assembly or assemblies 2. While under a pressure of between 10,000 and 20,000 psi, heat is applied to the blank assembly(ies) 2 between about 1100° and 1400° F. for a sufficient time of about 1-2 hours to achieve solid state bonding between the discs in the blank assembly(ies) 2. Good bonding between stainless steel and copper was obtained at a pressure of 16,000 psi at a temperature of 1200° F. after about one hour.

Each blank assembly 2, after solid state bonding, is removed to cool and are removed from the press apparatus. The solid state bonding of the pre-cut discs suitable for the manufacture of cookware is also disclosed in our co-pending U.S. patent application Ser. No. 14/215,287 filed Mar. 17, 2014, the contents of which are incorporated by reference herein.

Figure 6:
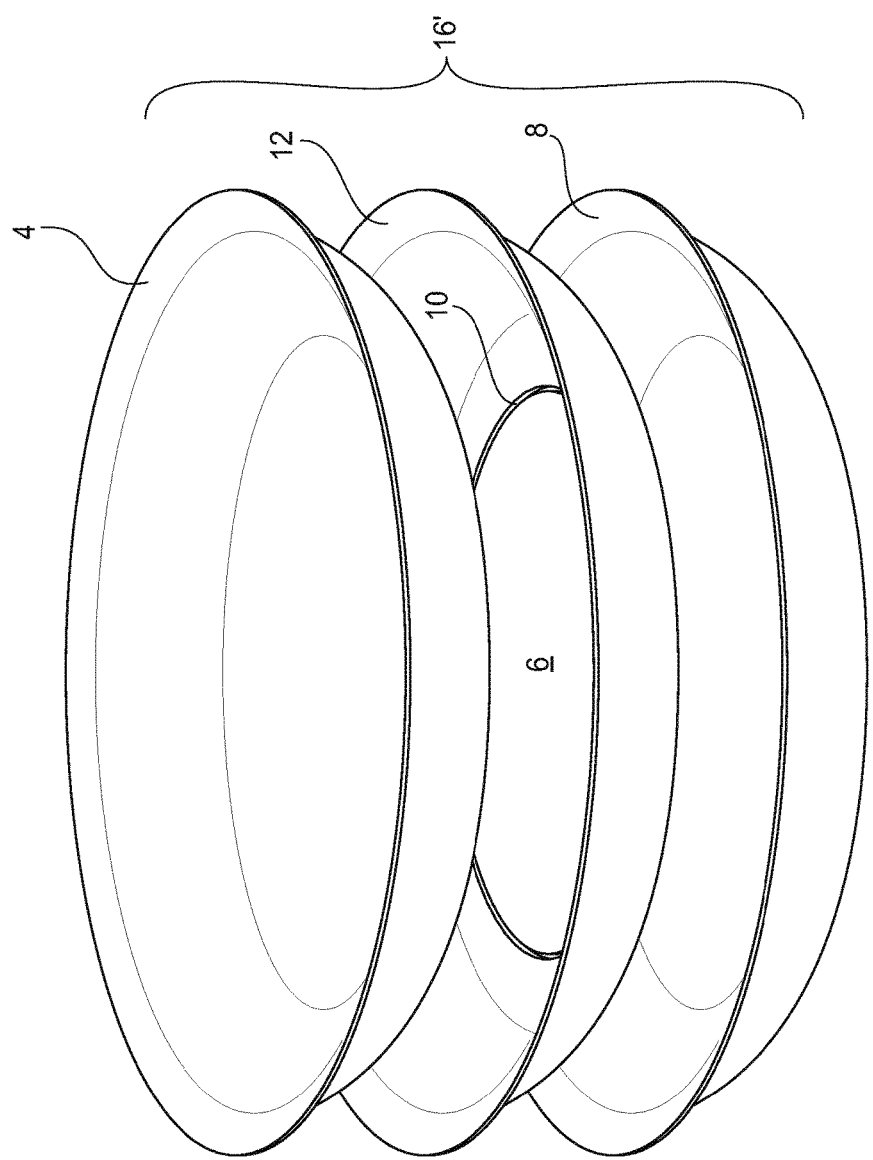
FIG. 6 is an exploded isometric view of the formed fry pan shape of FIG.4.

After solid state bonding, the bonded disc assembly 2 is formed in a drawing press or hydroform machine into a desired shape, such as a fry pan shape 16 depicted in FIG. 4. It will be seen in FIG. 4 that the ring-shaped aluminum disc 12, after forming, forms a portion of the flat bottom of the pan 16 and transitions through the radiused portion 15 to the sidewall 13. The sidewall 13 is a fully bonded three layer construction comprising the upper and lower stainless steel layers 4 and 8 and the ring-shaped aluminum core layer 12. The ring-shaped aluminum core layer 12 extends from the area adjacent the gap 10, extending to the bonded sidewall 13 and to the pan rim 16. A handle or handles (not shown) are then attached to the cookware in a known manner. An exploded view of the formed fry pan 16' showing the arrangement of the various layers is shown in FIG. 6.

The solid state bonding technique of bonding pre-cut near net shape disc blanks not only reduces scrap losses heretofore encountered in the conventional roll bonding manufacture of composite cookware but also permits the use of other materials in making multiple composites which have proven difficult, impossible and/or expensive to roll-bond. For example, the solid state bonding permits the use of different grades of stainless steel than otherwise possible in conventional roll bonding so as to lower costs of materials.

Figure 7:
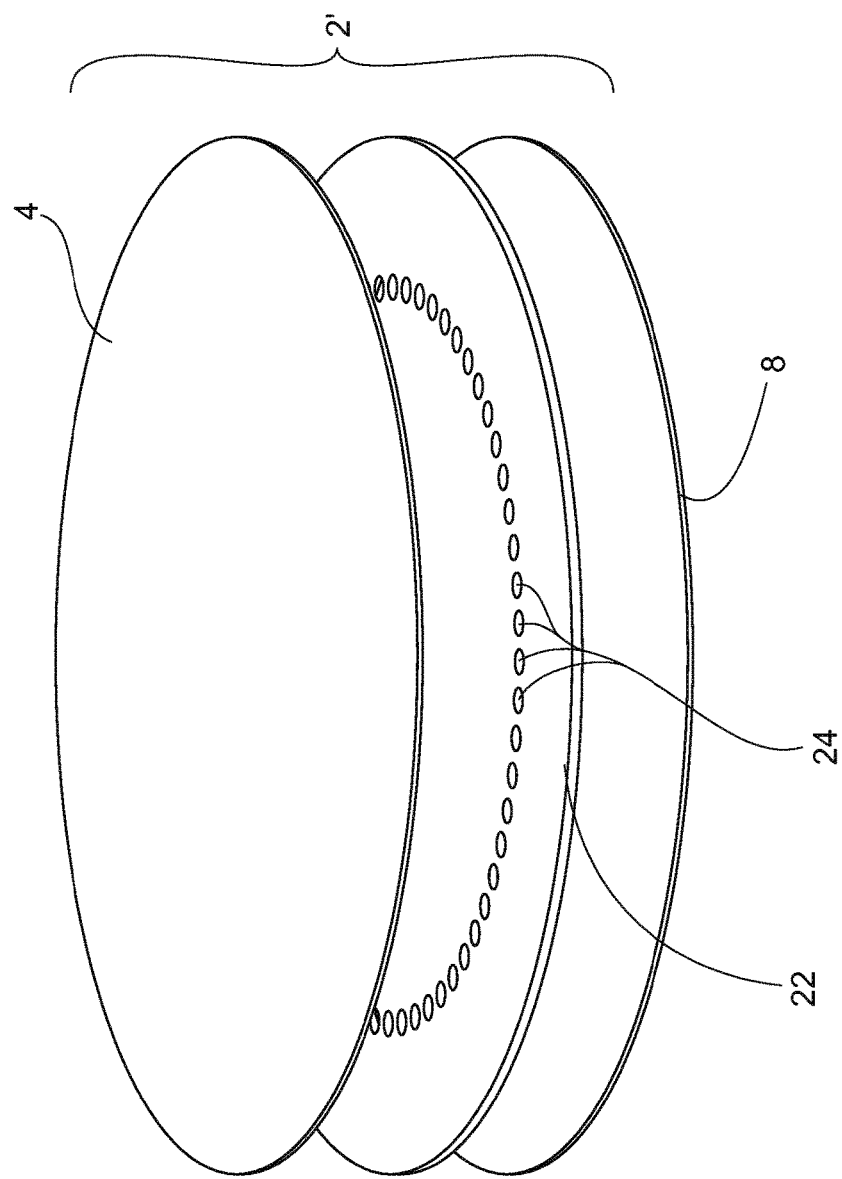
FIG. 7 is an exploded isometric view of an ordered array of a disc assembly in an alternate embodiment of the present invention.

A further embodiment of the invention for use in cookware is shown in FIG. 7. In this embodiment, the blank assembly 2' includes the previously described upper disc 4 and lower disc 8 of stainless steel. A unitary core disc 22, entirely of aluminum or copper, is employed in this embodiment in place of the previously described core disc 6 and ring-shaped disc 12. A plurality of spaced-apart holes 24 are formed in the aluminum or copper core disc 22 in a circular or ring shaped array around the core disc 22. The plurality of holes 24 act much like the previously described air gap 10 to provide an interrupted metal pathway for decreasing thermal conductivity between the central core of the bottom of the pan and the sidewall thereof. The holes 24 are formed in the circular array, inwardly spaced from the radiused portion 15 of the cookware. An aluminum core disc 22 may be between about 0.04 to 0.20 inches in thickness while all copper core disc 22 may be about 0.04 inches in thickness.

Figure 9:
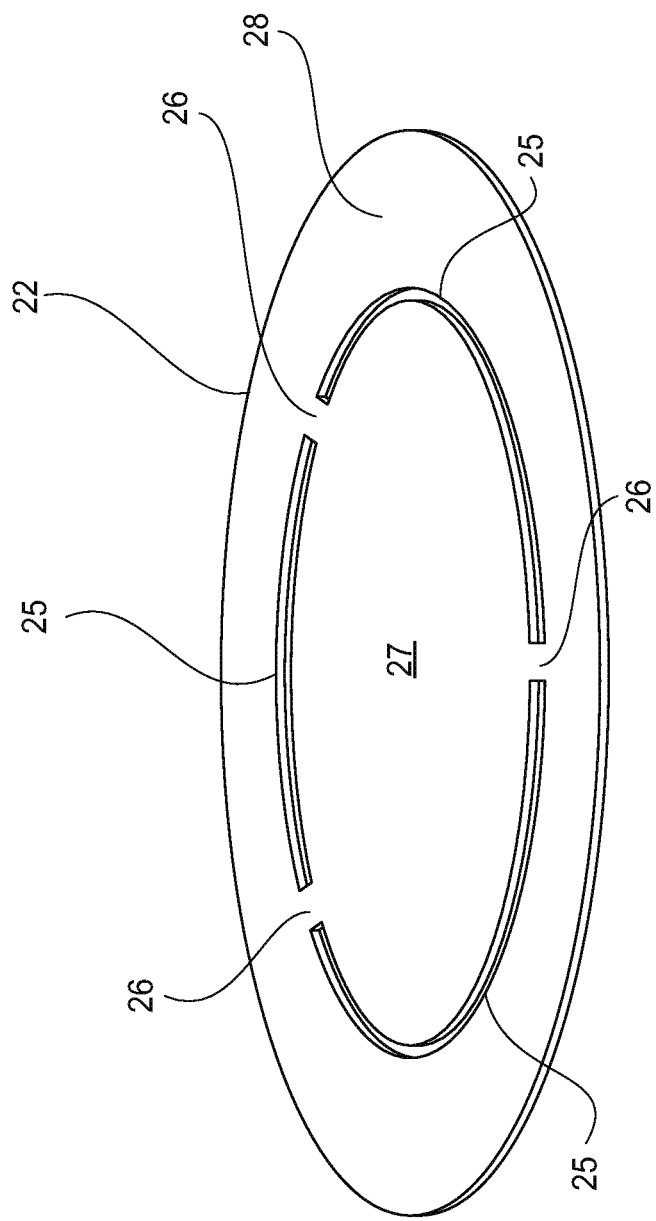
FIG. 9 is an isometric view of a further embodiment of the core disc of the present invention.

In a slightly different embodiment, the spaced-apart holes 24 can be replaced by a nearly continuous cut-out portion 25 shown in FIG. 9 formed by laser cutting for example. The laser cut portion of about 3/16" wide is formed in a circular or ring shaped path around the copper or aluminum disc 22 in a nearly continuous manner with the exception of several, for example, three, tabs or webs 26 which connect the central core disc portion 27 to the outer ring-shaped portion 28 of the core disc 22. The tabs or webs 26 function to center the central portion to maintain a constant spacing (3/16", for example) relative to the outer portion on the core disc.

Figure 8:
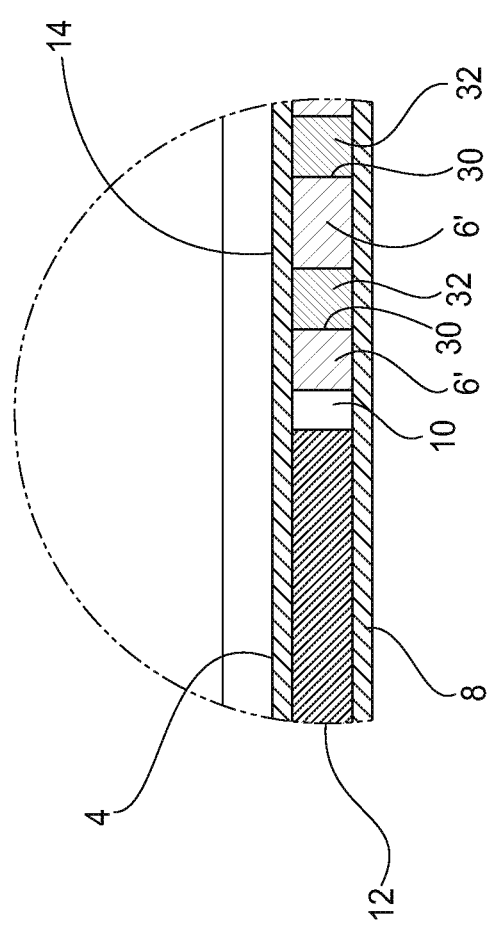
FIG. 8 is an enlarged view of the graphite material layer, hole, and aluminum plug in the formed fry pan of FIG. 4 in an alternate embodiment of the present invention.

Another embodiment of the present invention is shown in the enlarged view of FIG. 8. In place of the central core disc 6 of copper or aluminum, as described above, a central core disc 6' of graphite is employed. The graphite central core disc 6' may be pyrolytic graphite so as to transmit thermal energy radially so as to avoid very high heat transmission to the cooking surface 14. The graphite central core disc 6' preferably is about 0.040 inches thick and has a plurality of spaced-apart through holes 30 formed therethrough of about 0.25 inches in diameter, with each hole 30 positioned in about a one square inch area of the disc 6'. An aluminum pin or plug 32 having a diameter of 0.25 inches and a length of 0.040 is placed within each of the holes 30.

A ring-shaped disc 12 of aluminum of 0.40 inch thickness surrounds the graphite disc 6' and is spaced from the disc 6' by a gap 10 to provide the benefit of thermal insulation as previously explained. The upper and lower discs 4 and 8 of stainless steel are respectively placed above and below the core discs 6' and 12 and subjected to the solid state bonding operation (heat and pressure). The ends of the aluminum pins 32 then bond with the stainless steel discs 4 and 8 during the application of heat and pressure of the solid state bonding operation to secure the graphite disc 6' in place.

The invention claimed is:

1. Cookware made from a bonded, multi-layer composite comprising a core construction having a central core disc of a high heat conductive material having a diameter smaller than a cook surface of the cookware and an outer ring-shaped core layer surrounding and spaced from the central core disc by a gap to minimize thermal conduction from the central core disc to the outer ring-shaped core layer, wherein the outer ring-shaped core layer extends from the cook surface adjacent the gap to a sidewall and rim of the cookware, and wherein the multi-layer composite further includes upper and lower layers of stainless steel bonded on opposed sides of the central core disc and the outer ring-shaped core layer to define a continuously bonded sidewall around the cookware.

2. The cookware of claim 1, wherein the central core disc is one of aluminum or copper, and the outer ring-shaped core layer is aluminum.

3. The cookware of claim 2 in a form of a fry pan.

4. Cookware having a multi-layer bonded composite wall structure comprising an inner layer of stainless steel, a core layer and an outer layer of stainless steel, wherein the core layer comprises a central core disc of copper or aluminum positioned beneath a cooking surface of the cookware, the core layer further comprising an outer ring-shaped core layer spaced from the central core disc by substantially continuous air gap means, wherein the outer core layer forms a core layer of a bonded sidewall of the cookware and is adapted to be at a lower temperature than said central core disc by virtue of the air gap means when the cookware is in use.

5. The cookware of claim 4 in a form of a fry pan.

6. The cookware of claim 4, wherein the central core disc is aluminum and the outer ring-shaped core layer is aluminum.

7. The cookware of claim 6 in a form of a fry pan.

8. The cookware of claim 6, wherein the air gap means is a cut-out portion formed in a circular path substantially continuously around the core layer separating the central core disc from the outer ring-shaped layer, with the exception of a plurality of tabs joining the central core disc and outer ring-shaped layer together.

9. Cookware made from a bonded, multi-layer composite comprising a core construction having a central core disc of graphite and an outer ring-shaped core layer surrounding and spaced from the central core disc by a gap to minimize thermal conduction from the central core disc to the outer ring-shaped core layer, and including upper and lower layers of stainless steel, wherein the graphite central core disc has a plurality of spaced-apart holes formed therethrough and wherein each of the holes has an aluminum insert placed therein, wherein opposed ends of the aluminum inserts are bonded to the upper and lower stainless steel layers.

10. The cookware of claim 9 in a form of a fry pan.

11. The cookware of claim 9 wherein the graphite is pyrolytic graphite.

12. The cookware of claim 11 in a form of a fry pan.

13. Cookware having a multi-layer bonded composite wall structure comprising an inner layer of stainless steel, a core layer and an outer layer of stainless steel, wherein the core layer comprises a central core disc of aluminum positioned beneath a cooking surface of the cookware, the aluminum core layer further comprising an outer ring-shaped portion spaced from the central core disc by substantially continuous air gap means, wherein the outer ring-shaped portion forms a core of a bonded sidewall of the cookware and is adapted to be at a lower temperature than the central core disc by virtue of the air gap means when the cookware is in use, wherein the air gap means is a cut-out portion formed in a circular path substantially continuously around the core layer separating the central core disc from the outer ring-shaped portion, with the exception of a plurality of tabs joining the central core disc and outer ring-shaped portion together.

14. The cookware of claim 13 in a form of a fry pan.

\* \* \* \* \*